US012540567B1

(12) United States Patent
Li et al.

(10) Patent No.: US 12,540,567 B1
(45) Date of Patent: Feb. 3, 2026

(54) STRUCTURE OF SPLIT-TYPE OIL CHANNEL OF OIL FILTER BASE AND OIL COOLER CONNECTING BASE IN VEHICLE

(71) Applicant: WENZHOU BONAI AUTO RADIATOR CO., LTD., Wenzhou (CN)

(72) Inventors: Guang Li, Wenzhou (CN); Mingzheng Tao, Wenzhou (CN); Qi Ke, Wenzhou (CN)

(73) Assignee: WENZHOU BONAI AUTO RADIATOR CO., LTD., Wenzhou (CN)

( * ) Notice: Subject to any disclaimer, the term of this patent is extended or adjusted under 35 U.S.C. 154(b) by 0 days.

(21) Appl. No.: 18/914,459

(22) Filed: Oct. 14, 2024

(51) Int. Cl.
*F01M 1/10* (2006.01)
*F01M 11/03* (2006.01)

(52) U.S. Cl.
CPC ....... *F01M 1/10* (2013.01); *F01M 2001/1092* (2013.01); *F01M 2011/033* (2013.01); *F01M 2250/60* (2013.01)

(58) Field of Classification Search
CPC .......... F01M 1/10; F01M 11/03; F01M 5/002; F01M 2001/1092; F01M 2011/033; F01M 2250/60
See application file for complete search history.

(56) References Cited

U.S. PATENT DOCUMENTS

| 12,059,642 | B1 * | 8/2024 | Lin | B01D 35/18 |
| 12,320,279 | B1 * | 6/2025 | Li | F01M 5/002 |
| 2018/0065067 | A1 * | 3/2018 | Ardes | F01M 1/10 |
| 2022/0056823 | A1 * | 2/2022 | Kelly | F01M 11/03 |
| 2023/0055229 | A1 * | 2/2023 | Patil | F01M 1/10 |
| 2023/0287813 | A1 * | 9/2023 | Chen | B60K 11/04 |
| 2025/0129730 | A1 * | 4/2025 | Li | B01D 35/005 |

FOREIGN PATENT DOCUMENTS

| CN | 202081990 U | 12/2011 |
| CN | 202866930 U | 4/2013 |
| CN | 204098988 U | 1/2015 |
| CN | 109648239 A | 4/2019 |

* cited by examiner

*Primary Examiner* — Anna M Momper
*Assistant Examiner* — Mark K Buse
(74) *Attorney, Agent, or Firm* — George D. Morgan

(57) ABSTRACT

The present invention discloses an improved structure of a split-type oil channel of an oil filter base and an oil cooler connecting base in a vehicle, including an oil filter base, where a lower portion of the oil filter base is provided with an oil inlet, an oil outlet, and an oil return port, an end portion of the oil filter base is provided with an antifreeze solution water inlet, a bottom portion thereof is provided with a first water outlet and a second water outlet that are communicated with the antifreeze solution water inlet, an oil cooler is mounted on an upper portion of one end, away from a filter cartridge, of the oil filter base, an oil cooler connecting base is disposed between the oil filter base and the oil cooler, a surface of one side, close to the oil cooler.

10 Claims, 4 Drawing Sheets

STRUCTURE OF SPLIT-TYPE OIL CHANNEL OF OIL FILTER BASE AND OIL COOLER CONNECTING BASE IN VEHICLE

TECHNICAL FIELD

The present invention relates to an oil filter base in a vehicle, and in particular, to an improved structure of a split-type oil channel of an oil filter base and an oil cooler connecting base in a vehicle.

BACKGROUND

At present, the product is a plastic base early in the market and is made of PA66+GF35. In addition, the product adopts a plastic plug soldering structure process. Since the product is mounted at a lower end of an engine, which belongs to a high-temperature working environment, the market feeds back conditions that the product has a short service cycle, there are more customer complaints, the plastic member is not resistant to hydrolysis, not resistant to high temperature, and poor in thermal stability, resulting in early aging failure, and the soldering plug has defects of oil leakage and desoldering. Product quality and grade are affected. An original aluminium base (an oil filter base) is internally provided with an oil channel, which is far away from an oil cooler, resulting in a poor cooling effect.

According to an existing oil filter base in a vehicle, the oil filter base and the oil cooler are directly fixed together, and a connecting base is not designed, resulting in a poor cooling effect.

SUMMARY

The technical problem to be solved by the present invention is to provide an improved structure of a split-type oil channel of an oil filter base and an oil cooler connecting base in a vehicle in view of the deficiencies of the prior art.

In order to realize the above purpose, the present invention adopts the following measures.

An improved structure of a split-type oil channel of an oil filter base and an oil cooler connecting base in a vehicle is provided and includes an oil filter base, where a lower portion of the oil filter base is provided with an oil inlet, an oil outlet, and an oil return port, an end portion of the oil filter base is provided with an antifreeze solution water inlet, a bottom portion thereof is provided with a first water outlet and a second water outlet that are communicated with the antifreeze solution water inlet, a filter cartridge and a bypass valve are mounted in one end of the oil filter base, a filter cover is in threaded connection with one end, provided with the filter cartridge and the bypass valve, of the oil filter base, an oil cooler is mounted on an upper portion of one end, away from the filter cartridge, of the oil filter base, an oil cooler connecting base is disposed between the oil filter base and the oil cooler, a surface of one side, close to the oil cooler, of the oil cooler connecting base is parallelly provided with two parallel circulating cooling flow channels, and two ends of the two parallel circulating cooling flow channels are in circulating communication with the oil filter base and the oil cooler respectively.

The oil cooler connecting base is fixed between the oil filter base and the oil cooler in a clamping manner, and a plurality of threaded fasteners and hex head socket screws pass through the oil cooler and the oil cooler connecting base in sequence to be in threaded connection with the oil filter base.

The oil inlet is provided with an oil inlet sealing ring, and the oil outlet is provided with an oil outlet sealing ring; and the first water outlet and the second water outlet are both provided with water outlet sealing rings, the oil return port is provided with an oil return port sealing ring, and the filter cover is sleeved with a filter cover sealing ring.

A process hole of the oil return port is connected to an oil return port blocking screw, and a water passage process hole of the oil filter base is connected to a water passage process hole blocking screw.

An inner threaded hole shaft is disposed on the oil filter base, the inner threaded hole shaft passes through a seat hole on the oil cooler connecting base, and the threaded fastener and the hex head socket screw are in threaded connection with a threaded hole on the inner threaded hole shaft.

A cooler sealing ring for sealing the two parallel circulating cooling flow channels is disposed between the oil cooler and the oil cooler connecting base.

A temperature sensor and a pressure sensor are mounted at one end, away from the filter cover, of the oil filter base.

The oil filter base is made of aluminium magnesium alloy, and the filter cover is made of an aluminium alloy material.

The two parallel circulating cooling flow channels are provided with a sealing groove along an edge, and the cooler sealing ring is pressed in the sealing groove.

The oil filter base is of an L-shaped structure, a connection position between the oil filter base and the oil cooler connecting base is provided with a cavity, and a bottom surface of the cavity is of a slope structure.

Beneficial effects of the present invention: according to a design of a split structure of the oil cooler connecting base and the oil filter base, the oil channel is designed on the oil cooler connecting base, to be in close contact with the oil cooler, thereby accelerating to cool a connection effect with an oil passage, improving cooling efficiency, effectively reducing a risk of high-temperature failure occurring in a long-time driving process of a vehicle, increasing a product service life, reducing a product market failure rate and a customer complaint rate, and also improving product quality and grade at the same time.

DETAILED DESCRIPTION OF THE EMBODIMENTS

Figure 1:
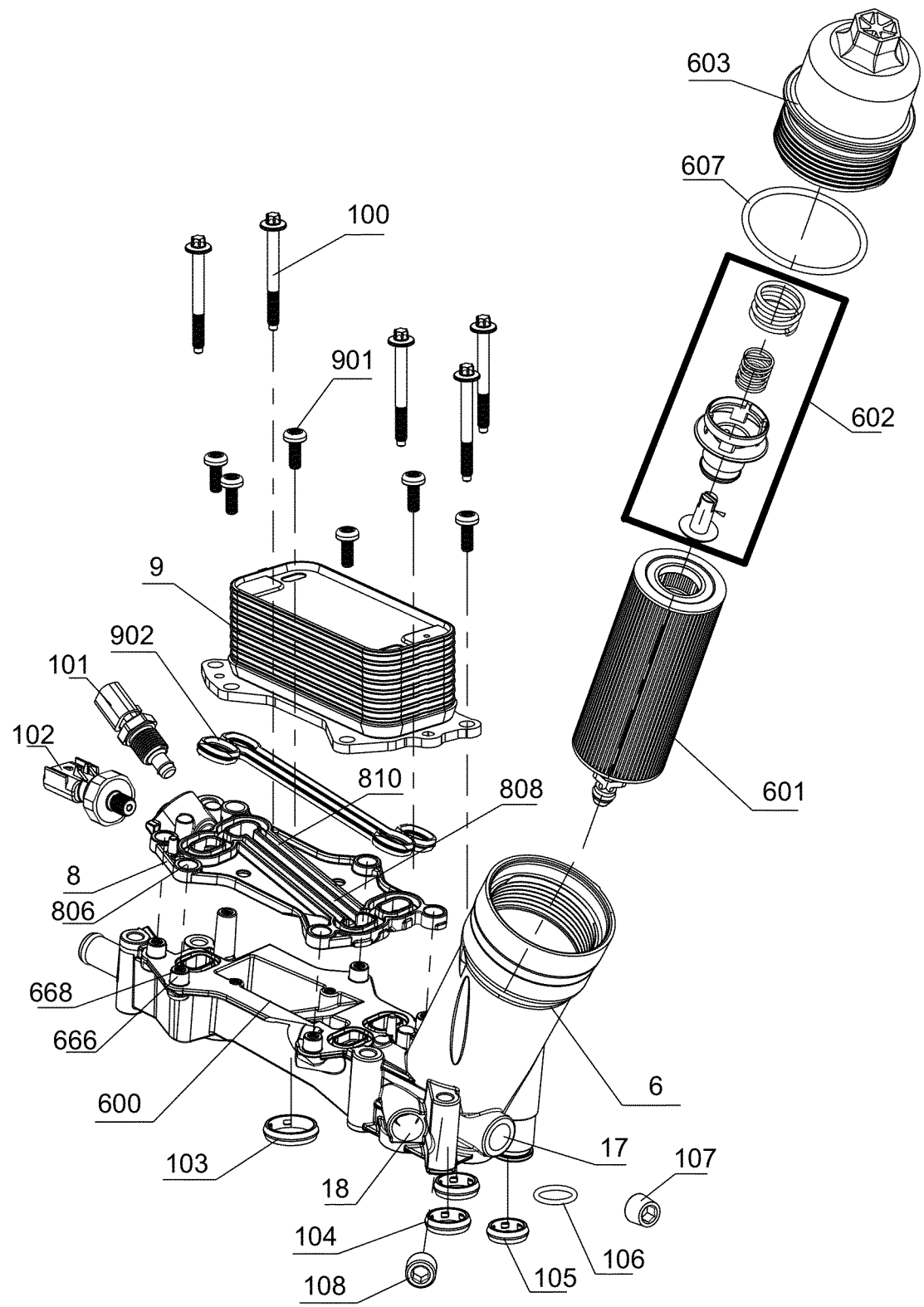
FIG. 1 is a schematic structural exploded view of the present invention.

An improved structure of a split-type oil channel of an oil filter base and an oil cooler connecting base in a vehicle is provided and includes an oil filter base 6, where a lower portion of the oil filter base 6 is provided with an oil inlet 7, an oil outlet 2, and an oil return port 5, an end portion of the oil filter base 6 is provided with an antifreeze solution water inlet 1, a bottom portion thereof is provided with a first water outlet 3 and a second water outlet 4 that are communicated with the antifreeze solution water inlet 1, a filter cartridge 601 and a bypass valve 602 are mounted in one end of the oil filter base 6, a filter cover 603 is in threaded connection with one end, provided with the filter cartridge 601 and the bypass valve 602, of the oil filter base 6, an oil cooler 9 is mounted on an upper portion of one end, away from the filter cartridge 601, of the oil filter base 6, an oil cooler connecting base 8 is disposed between the oil filter base 6 and the oil cooler 9, a surface of one side, close to the oil cooler 9, of the oil cooler connecting base 8 is parallelly provided with two parallel circulating cooling flow channels 808, two ends of the two parallel circulating cooling flow channels 808 are in circulating communication with the oil filter base 6 and the oil cooler 9 respectively, and the two ends of the two parallel circulating cooling flow channels 808 are both provided with holes penetrating up and down that are used to communicate the oil filter base 6 and the oil cooler 9.

Figure 2:
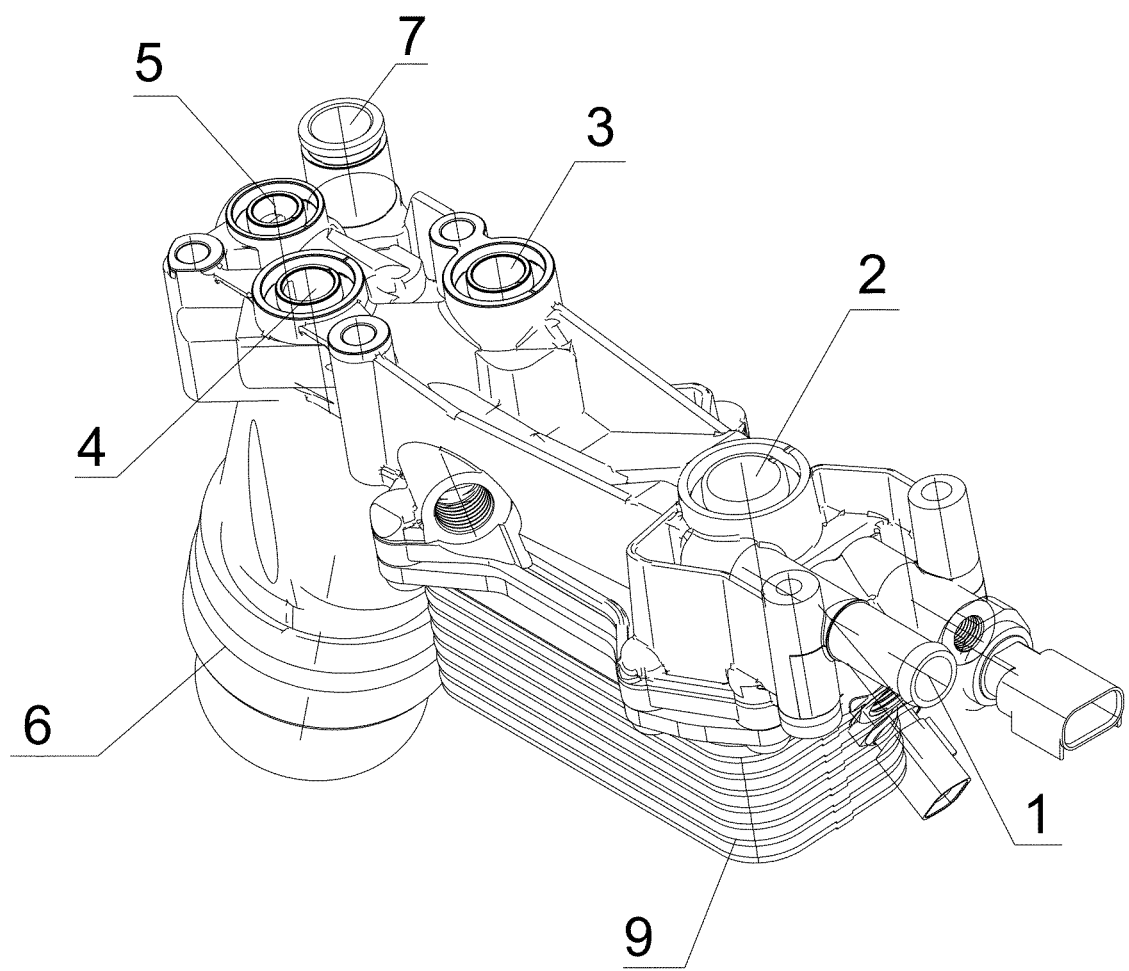
FIG. 2 is a schematic structural diagram of a lower side of the present invention.
Figure 3:
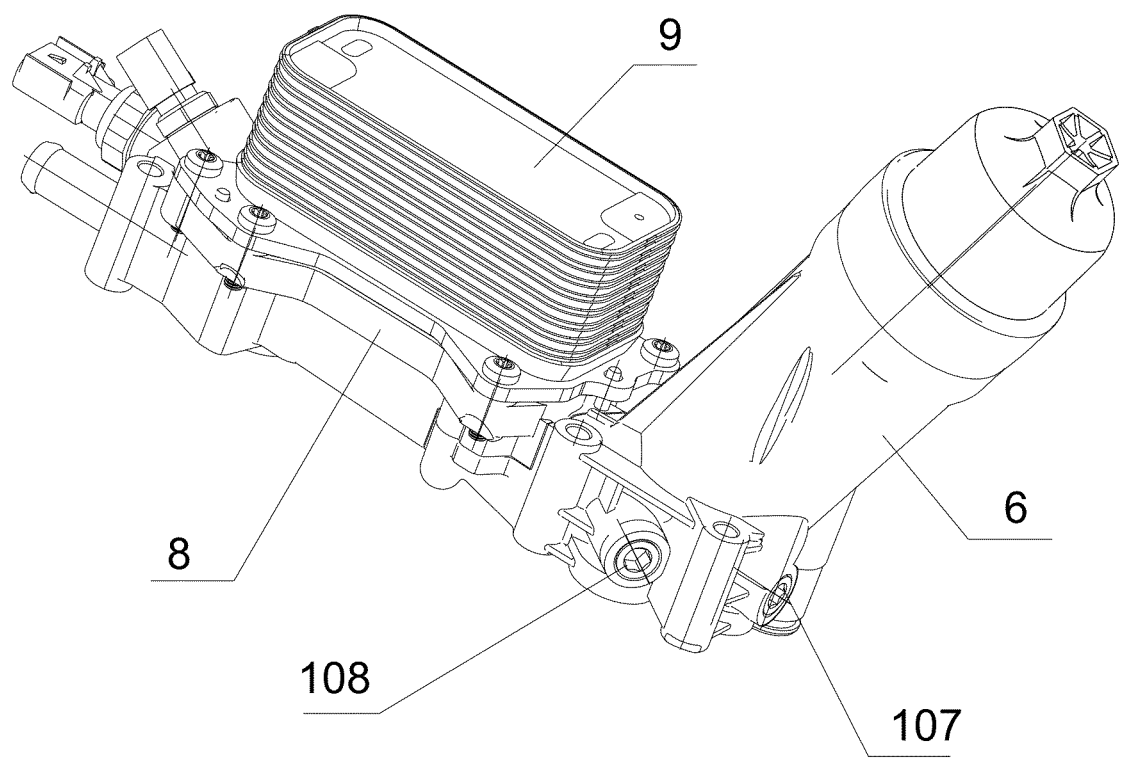
FIG. 3 is a schematic structural diagram of an upper side of the present invention.
Figure 4:
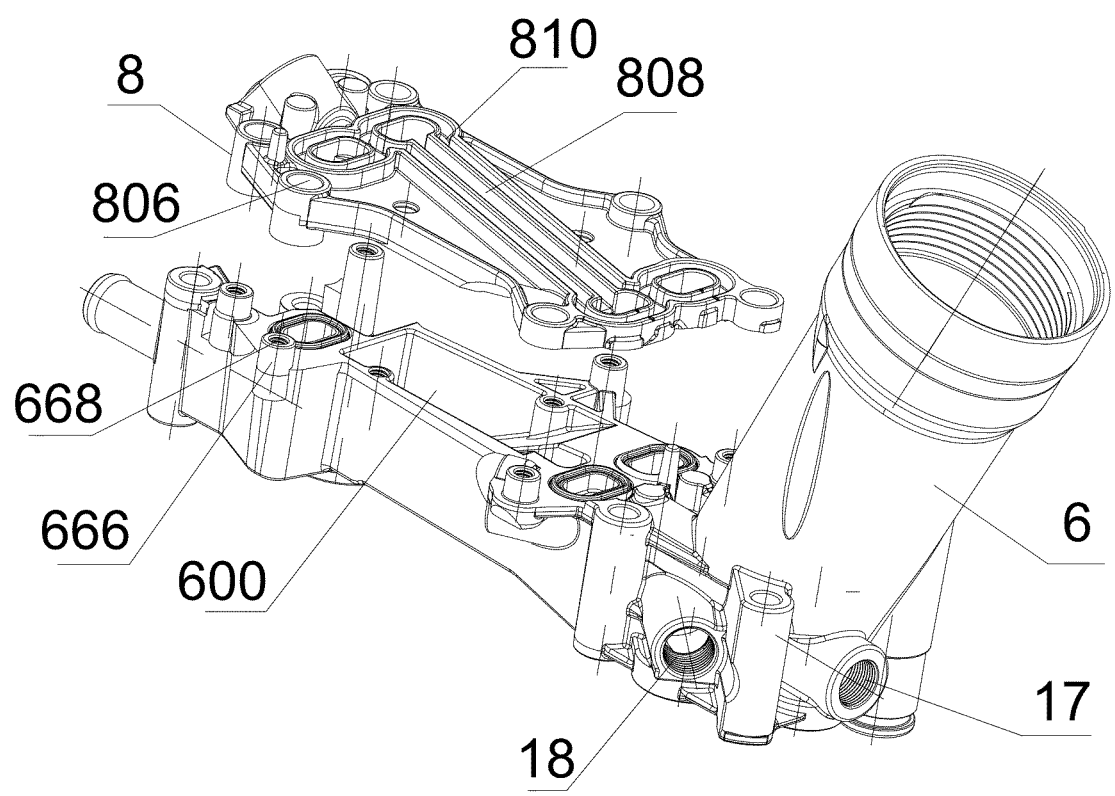
FIG. 4 is a schematic diagram of a split structure of an oil filter base and an oil cooler connecting base of the present invention.

As shown in FIG. 1 to FIG. 4, an improvement of the solution of the present application lies in that, the oil cooler connecting base 8 is added between the oil filter base 6 and the oil cooler 9, the oil filter base, the oil cooler, and the oil cooler connecting base are fixed together through a fixing member, the two parallel circulating cooling flow channels 808 are parallelly disposed on the oil cooler connecting base 8, and the two ends of the two parallel circulating cooling flow channels 808 are in circulating communication with the oil filter base 6 and the oil cooler 9 respectively.

A process hole oil channel and bolt plug blocking structure on a back end is improved to an end-face inclined-hole main oil channel structure on a front side.

A base auxiliary oil channel that is in an original oil filter base 6 is improved to a new auxiliary oil channel structure in which the two parallel circulating cooling flow channels 808 are added on an upper end surface of the oil cooler connecting base 8. The two parallel circulating cooling flow channels 808 added on the upper end surface of the oil cooler connecting base 8 are used as carriers for connection, to implement oil auxiliary supply of an engine and accelerate to cool a connection effect with an oil passage.

A base of the new structure is made of aluminium, and specifically: the oil filter base 6 is made of aluminium magnesium alloy; an oil passage structure of an oil filter base assembly is two parallel channels (the two parallel circulating cooling flow channels 808), blocking of a process hole at one end of a base oil channel adopts aluminium profile alloy lathing and a process of laser soldering after tightly fitting and pressing, and a threaded spin-on plug structure in an original state is canceled.

The oil cooler connecting base 8 is fixed between the oil filter base 6 and the oil cooler 9 in a clamping manner, and a plurality of threaded fasteners 100 and hex head socket screws 901 pass through the oil cooler 9 and the oil cooler connecting base 8 in sequence to be in threaded connection with the oil filter base 6.

The oil inlet 7 is provided with an oil inlet sealing ring 106, and the oil outlet 2 is provided with an oil outlet sealing ring 103; and the first water outlet 3 and the second water outlet 4 are both provided with water outlet sealing rings 104, the oil return port 5 is provided with an oil return port sealing ring 105, and the filter cover 603 is sleeved with a filter cover sealing ring 607.

A process hole 17 of the oil return port 5 is connected to an oil return port blocking screw 107, and a water passage process hole 18 of the oil filter base 6 is connected to a water passage process hole blocking screw 108. Specifically, blocking of the process hole adopts aluminium profile alloy lathing and a process of laser soldering after tightly fitting and pressing, and the threaded spin-on plug structure in the original state is canceled.

An inner threaded hole shaft 666 is disposed on the oil filter base 6, the inner threaded hole shaft 666 passes through a seat hole 806 on the oil cooler connecting base 8, and the threaded fastener 100 and the hex head socket screw 901 are in threaded connection with a threaded hole 668 on the inner threaded hole shaft 666. The inner threaded hole shaft 666 also plays a role of positioning through matching with the seat hole 806 while playing a role of connection.

A cooler sealing ring 902 for sealing the two parallel circulating cooling flow channels 808 is disposed between the oil cooler 9 and the oil cooler connecting base 8.

A temperature sensor 101 and a pressure sensor 102 are mounted at one end, away from the filter cover 603, of the oil filter base 6.

The oil filter base 6 is made of aluminium magnesium alloy, and the filter cover 603 is made of an aluminium alloy material.

The two parallel circulating cooling flow channels 808 are provided with a sealing groove 810 along an edge, and the cooler sealing ring 902 is pressed in the sealing groove 810.

The oil filter base 6 is of an L-shaped structure, a connection position between the oil filter base 6 and the oil cooler connecting base 8 is provided with a cavity 600, and a bottom surface of the cavity 600 is of a slope structure.

An improved solution of the present invention has obvious advantages, which specifically are: according to an oil filter base 6 in a new solution, an assembly aluminium base of the oil filter base is directly communicated with the auxiliary oil channel, and that the oil channel is disposed in an original aluminium base is improved to that the two parallel circulating cooling flow channels 808 are parallelly disposed on the oil cooler connecting base 8, to implement oil auxiliary supply of an engine and accelerate to cool a connection effect with an oil passage. The original aluminium base is internally provided with an oil channel, which is far away from the oil cooler 9, resulting in a poor cooling effect. After improvement of the solution of the present application, the two parallel circulating cooling flow channels 808 are closely in contact with the oil cooler 9, so that the cooling effect is better, thereby improving cooling efficiency. The two parallel circulating cooling flow channels 808 are generally inclined at an angle, so that lengths of the two parallel circulating cooling flow channels 808 are longer, and the cooling efficiency is higher.

In application of the solution of the present application: Oil passage: engine oil enters into the oil filter assembly from the oil inlet 7, is filtered by the filter cartridge 601, (the bypass valve 602 is internally disposed, and a structure herein is the same as an existing structure), and then enters the oil cooler 9 for cooling. The oil is also cooled and directly returns to the engine through the two parallel circulating cooling flow channels 808, and the filtered and cooled oil returns to the engine for lubricating from the oil outlet 2. When the filter cartridge 601 is changed, internal redundant oil returns to the engine from the oil outlet 2.

Water passage: a whole vehicle antifreeze solution enters into the oil filter base assembly from the antifreeze solution water inlet 1, then enters into the oil cooler 9 to take away the heat of high-temperature oil of the engine for cooling, and then returns to a whole vehicle circulating cooling system and an air conditioning system respectively through the first water outlet 3 and the second water outlet 4.

What is claimed is:

1. An improved structure of a split-type oil channel of an oil filter base and an oil cooler connecting base in a vehicle, comprising an oil filter base (6), wherein a lower portion of the oil filter base (6) is provided with an oil inlet (7), an oil outlet (2), and an oil return port (5), an end portion of the oil filter base (6) is provided with an antifreeze solution water inlet (1), a bottom portion thereof is provided with a first water outlet (3) and a second water outlet (4) that are communicated with the antifreeze solution water inlet (1), a filter cartridge (601) and a bypass valve (602) are mounted in one end of the oil filter base (6), a filter cover (603) is in threaded connection with one end, provided with the filter cartridge (601) and the bypass valve (602), of the oil filter base (6), and an oil cooler (9) is mounted on an upper portion of one end, away from the filter cartridge (601), of the oil filter base (6), wherein an oil cooler connecting base (8) is disposed between the oil filter base (6) and the oil cooler (9), a surface of one side, close to the oil cooler (9), of the oil cooler connecting base (8) is provided with two circulating cooling flow channels (808) arranged in parallel, each of the two circulating cooling flow channels (808) having a first end and a second end, two first ends of the two parallel circulating cooling flow channels (808) are in circulating communication with the oil filter base (6) and two second ends of the two parallel circulating cooling flow channels (808) are in circulating communication with the oil cooler (9).

2. The improved structure of a split-type oil channel of an oil filter base and an oil cooler connecting base in a vehicle according to claim 1, wherein the oil cooler connecting base (8) is fixed between the oil filter base (6) and the oil cooler (9) in a clamping manner, and a plurality of threaded fasteners (100) and hex head socket screws (901) pass through the oil cooler (9) and the oil cooler connecting base (8) in sequence to be in threaded connection with the oil filter base (6).

3. The improved structure of a split-type oil channel of an oil filter base and an oil cooler connecting base in a vehicle according to claim 2, wherein the oil inlet (7) is provided with an oil inlet sealing ring (106), and the oil outlet (2) is provided with an oil outlet sealing ring (103); and the first water outlet (3) and the second water outlet (4) are both provided with water outlet sealing rings (104), the oil return port (5) is provided with an oil return port sealing ring (105), and the filter cover (603) is sleeved with a filter cover sealing ring (607).

4. The improved structure of a split-type oil channel of an oil filter base and an oil cooler connecting base in a vehicle according to claim 3, wherein a process hole (17) of the oil return port (5) is connected to an oil return port blocking screw (107), and a water passage process hole (18) of the oil filter base (6) is connected to a water passage process hole blocking screw (108).

5. The improved structure of a split-type oil channel of an oil filter base and an oil cooler connecting base in a vehicle according to claim 4, wherein an inner threaded hole shaft (666) is disposed on the oil filter base (6), the inner threaded hole shaft (666) passes through a seat hole (806) on the oil cooler connecting base (8), and the threaded fastener (100) and the hex head socket screw (901) are in threaded connection with a threaded hole (668) on the inner threaded hole shaft (666).

6. The improved structure of a split-type oil channel of an oil filter base and an oil cooler connecting base in a vehicle according to claim 5, wherein a cooler sealing ring (902) for sealing the two parallel circulating cooling flow channels (808) is disposed between the oil cooler (9) and the oil cooler connecting base (8).

7. The improved structure of a split-type oil channel of an oil filter base and an oil cooler connecting base in a vehicle according to claim 6, wherein a temperature sensor (101) and a pressure sensor (102) are mounted at one end, away from the filter cover (603), of the oil filter base (6).

8. The improved structure of a split-type oil channel of an oil filter base and an oil cooler connecting base in a vehicle according to claim 7, wherein the oil filter base (6) is made of aluminium magnesium alloy, and the filter cover (603) is made of an aluminium alloy material.

9. The improved structure of a split-type oil channel of an oil filter base and an oil cooler connecting base in a vehicle according to claim 8, wherein the two parallel circulating cooling flow channels (808) are provided with a sealing groove (810) along an edge, and the cooler sealing ring (902) is pressed in the sealing groove (810).

10. The improved structure of a split-type oil channel of an oil filter base and an oil cooler connecting base in a vehicle according to claim 9, wherein the oil filter base (6) is of an L-shaped structure, a connection position between the oil filter base (6) and the oil cooler connecting base (8) is provided with a cavity (600), and a bottom surface of the cavity (600) is of a slope structure.

* * * * *